United States Patent [19]

Kurata et al.

[11] Patent Number: 4,598,999

[45] Date of Patent: Jul. 8, 1986

[54] AREA DETECTION METHOD OF AN ORIGINAL FOR USE IN COPYING MACHINES

[75] Inventors: Masami Kurata; Hiroyuki Saitoh, both of Ebina, Japan

[73] Assignee: Fuji Xerox Co., Ltd., Tokyo, Japan

[21] Appl. No.: 551,878

[22] Filed: Nov. 15, 1983

[30] Foreign Application Priority Data

Nov. 19, 1982 [JP] Japan ................................ 57-203447

[51] Int. Cl.[4] ....................... G01B 11/28; G01B 11/02; G03B 27/44

[52] U.S. Cl. .................................... 356/380; 356/384; 356/387; 355/54; 355/59

[58] Field of Search ............... 356/379, 380, 383, 384, 356/387; 355/41, 54, 59

[56] References Cited

U.S. PATENT DOCUMENTS 4,332,475 6/1982 Demarest ............................ 356/387

*Primary Examiner*—R. A. Rosenberger
*Assistant Examiner*—Crystal Cooper
*Attorney, Agent, or Firm*—Spensley Horn Jubas & Lubitz

[57] ABSTRACT

The area detection method detects an area on an original enclosed with a mark of specific color by the steps of scanning the original by a photosensor, judging whether the number of the mark segment detected by the photosensor in a single scan line is an even or odd number for each scan and detecting the area based on the output of the photosensor in the scan period for which the judgement is made that the number of the detected mark segment is an even number.

5 Claims, 7 Drawing Figures

AREA DETECTION METHOD OF AN ORIGINAL FOR USE IN COPYING MACHINES

BACKGROUND OF THE INVENTION

1. Field of the Invention

The present invention relates to the field of area detection methods of the original to be applied to such copying machines as the so-called intelligent copying machine and in particular, a method for detecting an area by optically reading the mark of a specific color entered on the original.

2. Description of the Prior Art

An intelligent copying machine is a copying machine which performs specific copying processing in only a specified area of the original, such as erasure, extraction, color copying, enlargement, and reduction.

In a prior art intelligent copying machine as shown in FIG. 1, cursors 2, 3 and cursors 4, 5 are typically provided in the vertical and the horizontal directions of a platen 1 respectively, and by shifting these cursors an area A shown in diagonal lines is designated on an original 7. The area A is detected based on electric signals showing the shifted positions of the cursors 2 to 5.

The shifting of the cursors 2 to 5 is performed with the side to be copied of the original placed on the platen 1, i.e., in a state where the content of the original is not visible to an operator. Accordingly, considerable time and effort is required for the designation of the area, and yet the operator is likely to designate an incorrect area different from the intended one.

A method has been proposed in a conventional intelligent copying machine wherein, as shown in FIG. 2, an area A' of the original 7 encircled by a mark 8 of a specific color is detectected by scanning the original 7 with a photosensor sensitive only to the specific color of the mark 8. More particularly, points p and p' in which p is a point at which the photosensor detected the mark 8 the first time (start point) and p' is a point the photosensor detected the mark 8 the next time (end point) are detected is each scan line, length and position of section p-p' are measured and the entire area A is detected based on the data of these sections.

According to this area detection method, however, when the photosensor scan is performed at the top or bottom end of the mark 8, the contact point of the scan line with the mark 8 is taken as the start point p of the section and the end of the scan line as the end point p' of the section, causing a detection error of the area A'.

SUMMARY OF THE INVENTION

The present invention is directed to provide an area detection method of the original for use in copying machines capable of accurate detection of the area enclosed with a mark of a specific color based on the output signals of a photosensor.

In order to attain the above-mentioned objective, an original on which a loop-like area designation mark of a specific color is entered in advance is scanned so as to make judgment in each scan line on whether the mark is detected in the even or odd number of times within a single scan line by a photosensor, and the area enclosed with the mark is detected based on the photosensor output signals in the scan line for which the number of the mark detection signals is judged as an even number.

DETAILED DESCRIPTION OF PREFERRED EMBODIMENTS

Figure 1:
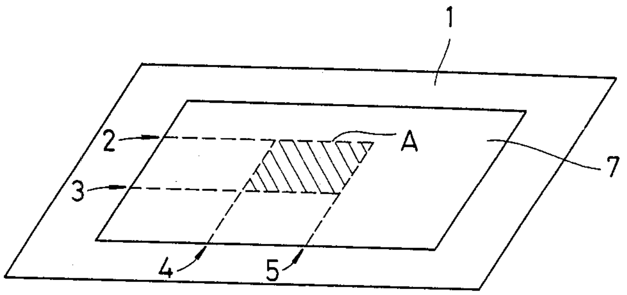
FIG. 1 PRIOR ART
FIG. 1 is a schematic view illustrating an example of prior art area designation method.
Figure 2:
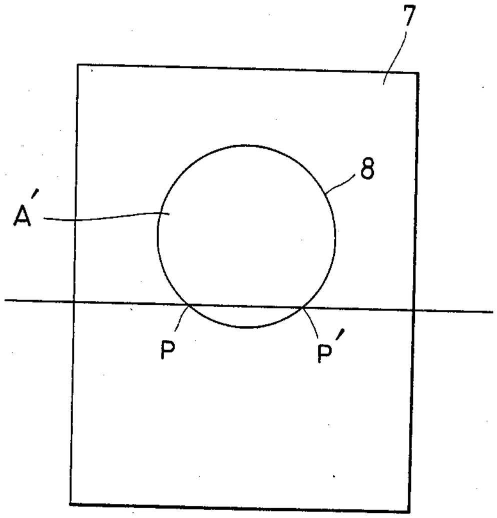
FIG. 2 is a plan view showing an example of the original having a mark entered therein.
Figure 3:
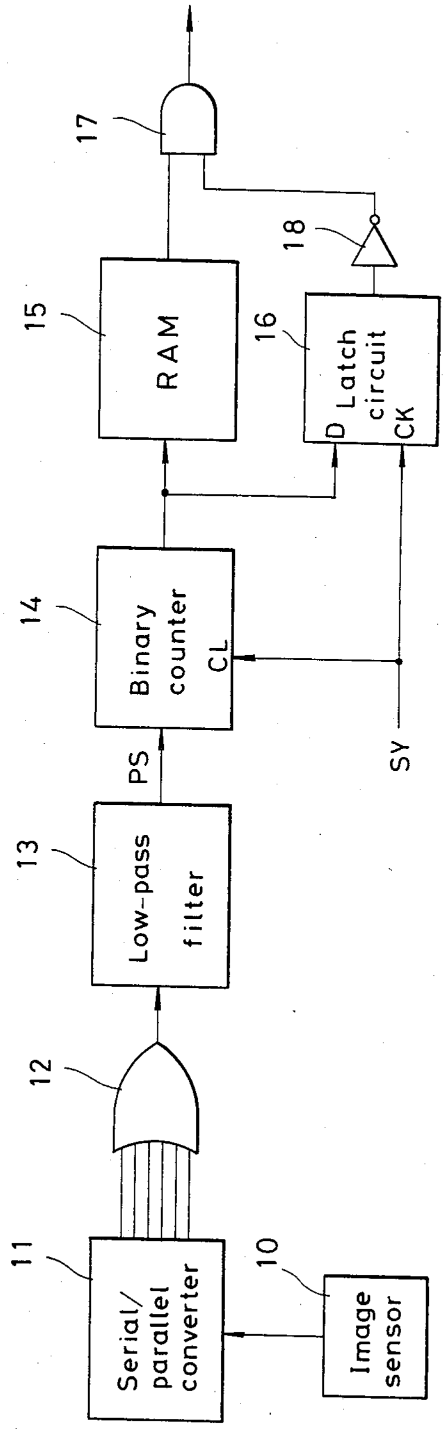
FIG. 3 is a block diagram showing an embodiment of the equipment for putting the area detection method of the present invention into practice.

Referring now to FIG. 3, an image sensor 10 is for scanning the original 7 shown in FIG. 2 on which a mark 8 of a specific color is drawn. The image sensor 10 outputs a mark detection signal "1" when the mark 8 is detected. A serial/parallel converter 11, which comprises a 6-bit shift register, converts a 1-bit picture signal sequentially fed from the image sensor 10 into a 6-bit parallel signal through the sequential shift at the sampling period of the sensor 10, and applies this parallel signal to an OR circuit 12.

The OR circuit 12 performs logical sum for the picture signal at each bit of the serial/parallel converter 11, and feeds the output signal to a binary counter 14 through a low-pass filter 13. By performing the above logical sum, even when the mark 8 is not clear, the detection of the picture signal can be assured. In addition, by directing the signal through the low-pass filter 13, noise due to stain on the original or other cause can be removed.

The binary counter 14 outputs "0" or "1", and is cleared to "0" when a synchronizing signal SY which is output each time a scan is completed is fed. Thereafter, each time the picture signal PS which is fed from the low-pass filter rises to "1", the binary counter 14 outputs the signal "1" and the signal "0" alternately.

Figure 4:
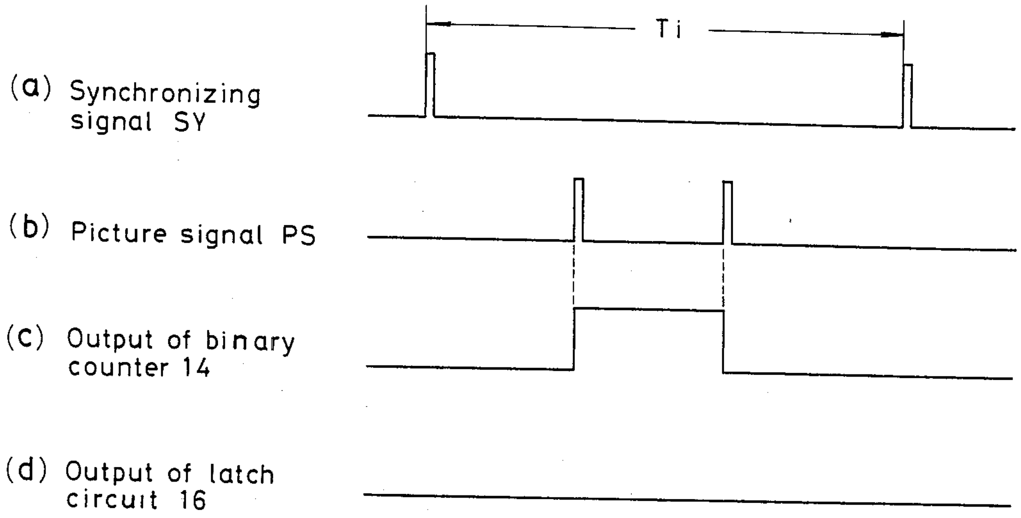
FIG. 4 illustrates the timing function of the invention when the picture signal rises twice in the single scan.

Accordingly, as shown in FIG. 4(*b*), when the picture signal PS rises to "1" twice in a single scan, i.e., when the image sensor 10 outputs two mark detection signals "1", the binary counter 14 outputs the signal "1" during the period between the time when the picture signal PS rises to "1" the first time and the time when the picture signal PS rises to "1" the next time as shown in FIG. 4(*c*). On the other hand, when the picture signal PS rises only once in a scan as shown in FIGURE 6(*b*), the binary counter 14 outputs "1" during the period between the time when the picture signal PS rises to "1" as shown in FIG. 6(*c*) and the time when the synchronizing signal SY is fed.

The output of the binary counter 14 is fed to a random access memory 15 and the input D of a latch circuit 16. The memory 15 temporarily stores the output signal of the binary counter 14 as a data indicating a certain period in a single scan line and outputs the stored signal in the next scan line in the same form, and applies the signal thus output to an AND circuit 17. The latch circuit 16 latches the output signal of the binary counter 14 fed to its input D at the timing when the synchronizing signal SY is fed, applies the latched signal to an inverter 18 for the signal inversion, and feeds the signal thus inverted to the AND circuit 17.

The latch circuit 16 performs latching when the synchronizing signal SY rises, and the counter 14 is cleared when the synchronizing signal falls, i.e., the latch circuit latches the counter output immediately before the binary counter 14 is cleared by the synchronizing signal SY.

Figure 6:
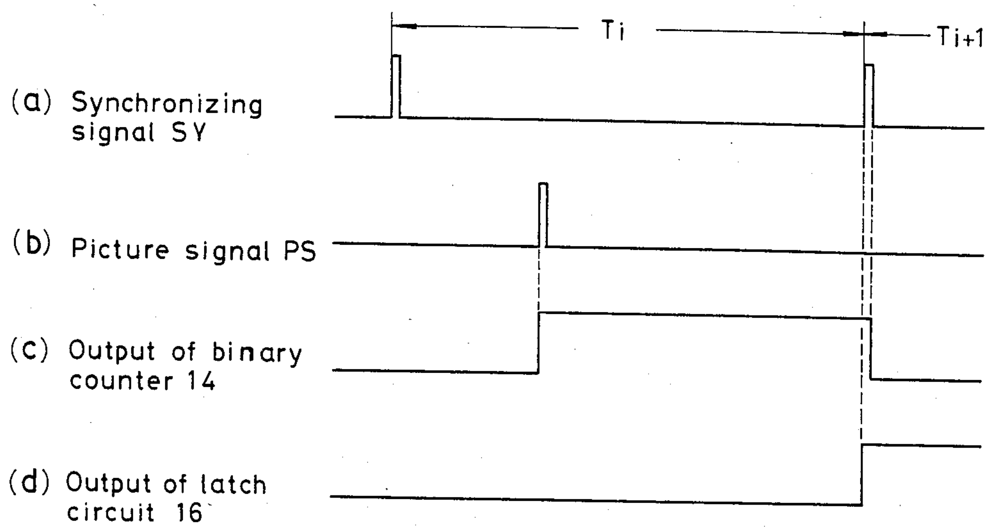
FIG. 6 illustrates the timing function of the invention when the picture signal rises only once in a single scan.

Therefore, when the number of the mark detection signals "1" fed to the binary counter 14 in a single scan is an even number (including 0), the output of the latch circuit 16 becomes "0" (Refer to FIG. 4(*d*)), while when the number is an odd number, the output of the latch circuit 16 becomes "1" (refer to FIG. 6(*d*)).

The AND circuit 17 becomes operational when the signal latched by the latched circuit 16 is "0", i.e., when the signal "1" is output from the inverter 18.

Figure 5:
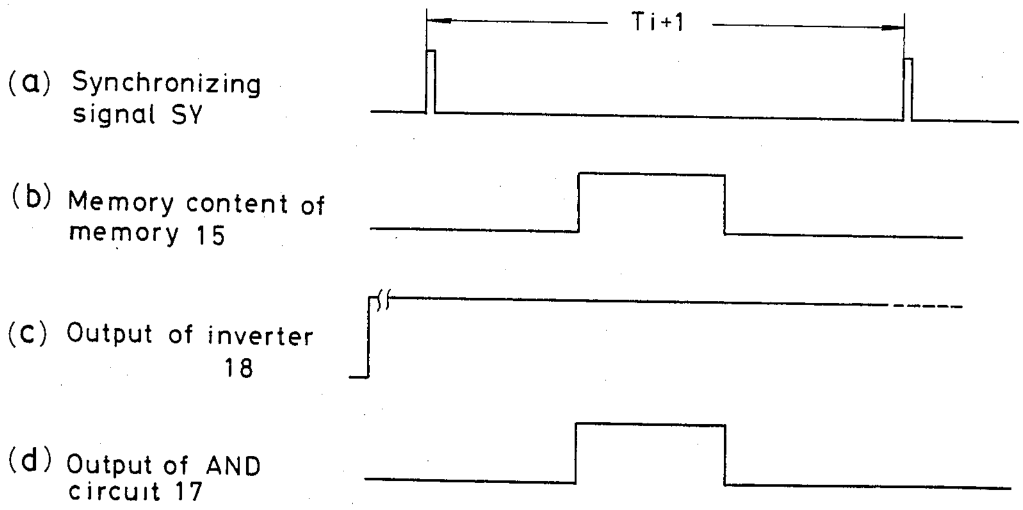
FIG. 5 illustrates the memory output resulting from the timing function illustrated in FIG. 4.

When two mark detection signals "1" appear during the scan line Ti as shown in FIG. 4(*b*), i.e., when the scan line intersects the mark 8 twice as shown in FIG. 2, the latch circuit 16 latches the output "0" of the counter 14, and the output of the inverter 18 becomes "1" in the next scan line Ti+1 as shown in FIG. 5(*c*). As a result, the memory content of the memory 15 shown in FIG. 5(*b*) is output from the AND circuit 17 as shown in FIG. 5(*d*). This output of the AND circuit 17 represents the position and the length of the section between two points at which the scan line intersects the mark 8.

Figure 7:
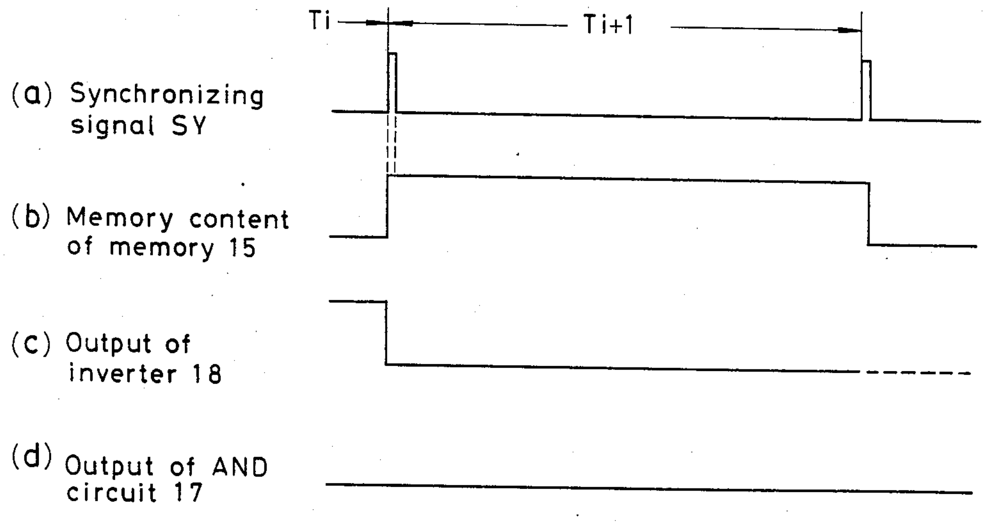
FIG. 7 illustrates the memory output of the timing function illustrated in FIG. 6.

On the other hand, when only one mark detection signal "1" appears during the scan line Ti as shown in FIG. 6(*b*), i.e., when the scan line contacts the top or bottom point of the mark 8, the latch circuit 16 latches the output "1" of the counter 14, and the output of the inverter 18 becomes "0" in the next scan line Ti+1 as shown in FIG. 7(*c*). Accordingly, in this case, the memory content of the memory 15 shown in FIG. 7(*b*) is not output from the AND circuit 17 as shown in FIG. 8(*d*).

In this manner, when the mark 8 as shown in FIG. 2 is entered on the original 7, the signal representing the position and the length of the section between the scan points is picked up at the output end of the AND circuit 17 only when the scan line of the image sensor 10 intersects the mark 8 twice. Accordingly, the area A′ enclosed with the mark 8 can be detected based on the output signal of the AND circuit 17 in each scan line. When the area A′ is detected, processing such as aforementioned erasure, extraction, color copying, enlargement, and reduction can be performed only for the area A′.

What is claimed is:

1. An area detection method of an original for use in copying machines comprising steps of:

entering a mark of a specific color onto an original so that the mark encloses an area of the original;

scanning the original by a photosensor to cause the mark to be detected by the photosensor;

judging whether the number of mark segments detected by the photosensor in a single scan line is an even or odd number for each scan line; and detecting the area enclosed by the mark based on the output of the photosensor in the scan lines for which the judgement is made that the number of the detected mark segment is an even number.

2. The area detection method of claim 1 wherein said photosensor is an image sensor.

3. The area detection method of claim 2 further comprising steps of obtaining signals representing the timing at which said mark is detected by executing sampling on the output signal of said image sensor; sequentially storing the sampled value obtained by said sampling into a shift register with the timing of said sampling; and executing logical sum for each bit of said shift register.

4. The area detection method of claim 3 wherein said judging step is conducted after said sampling, storing, and executing steps.

5. The area detection method of claim 3 wherein said judging step comprises the steps of counting the number of said signals representing the timing at which said mark is detected, and making judgment as to whether the number of mark segments detected by the photosensor in a single scan line is an even or odd number for each scan line is conducted on the basis of the result of the counting.

* * * * *